United States Patent Office 3,291,021
Patented Dec. 13, 1966

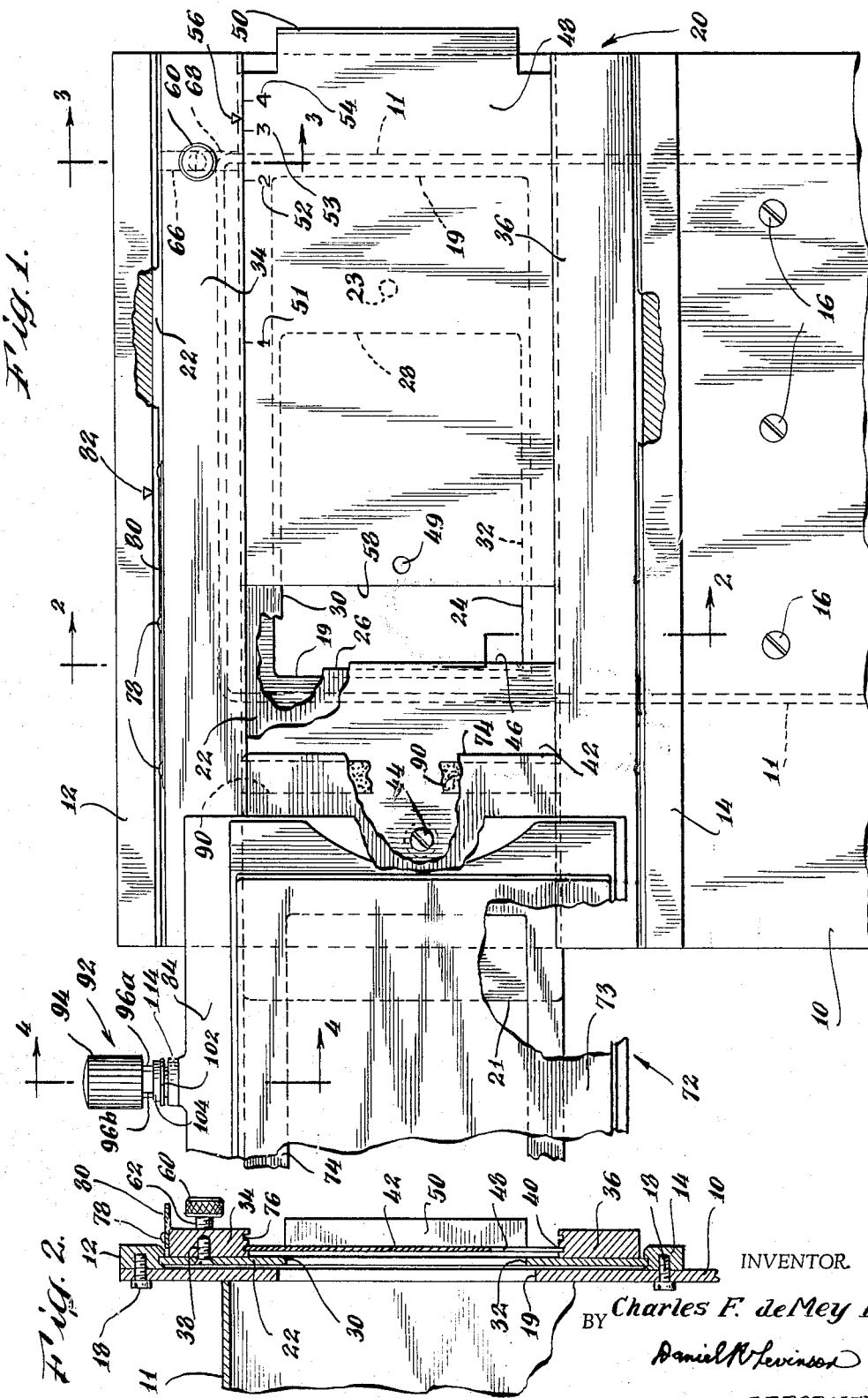

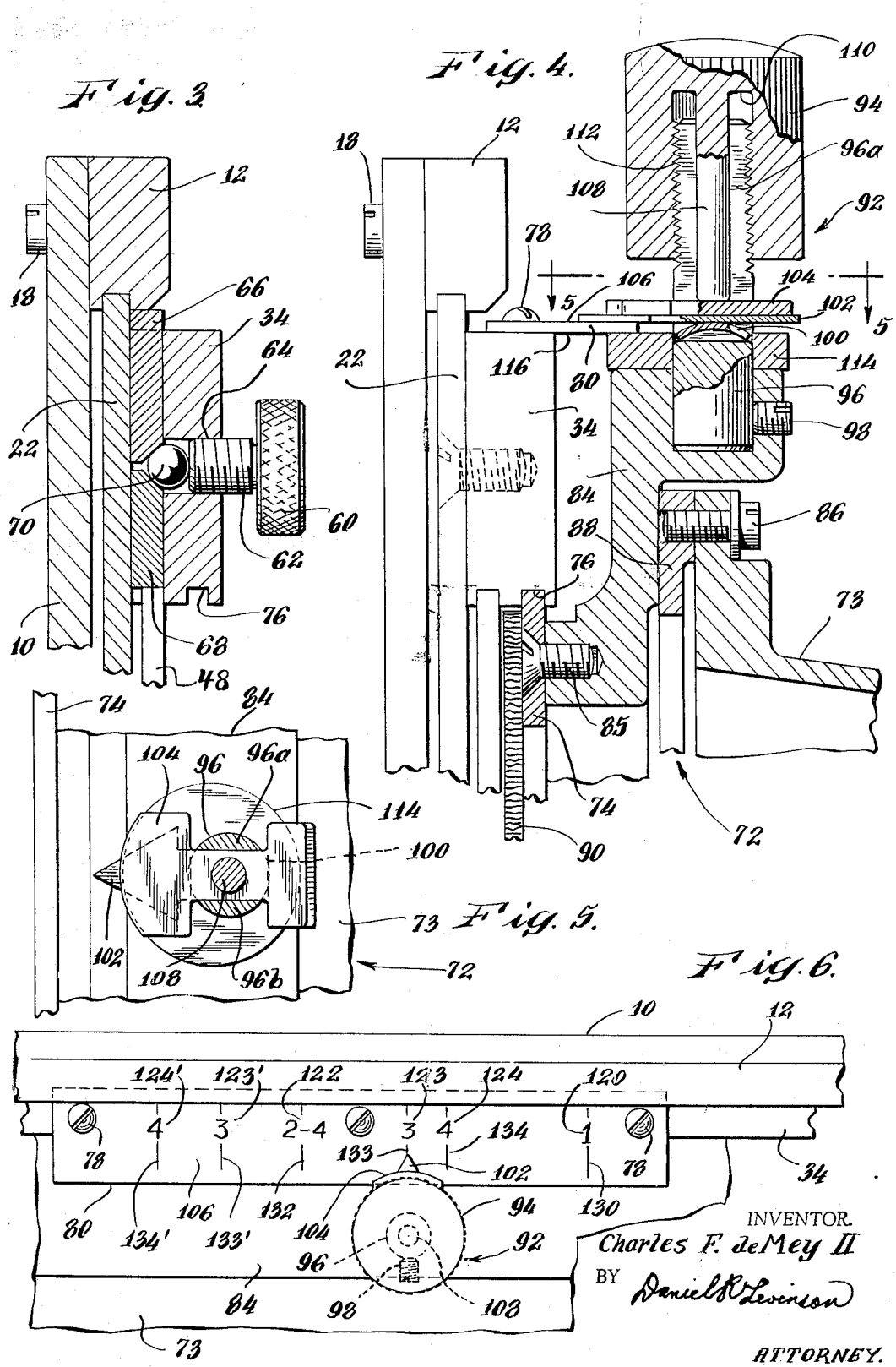

3,291,021
CAMERAS FOR DIFFERENT SIZE PICTURES
Charles F. de Mey II, West Redding, Conn., assignor to The Perkin-Elmer Corporation, Norwalk, Conn., a corporation of New York
Filed July 24, 1964, Ser. No. 384,972
8 Claims. (Cl. 95—36)

This invention relates to a camera and slide assembly, which allows the taking of pictures of images having both different sizes and somewhat different positions in an efficient manner. More specifically the invention allows the taking of a plurality of pictures on a single film sheet, wherein the number of pictures being taken and the centering thereof on the part of the film used for each picture is under control of the operator, who is assisted in utilizing the film in an efficient manner by the apparatus itself.

In the specific embodiment hereinafter more fully described, the operator may take from one to four separate pictures on a single film sheet. Although it will be obvious that the device may be readily adapted to be capable of taking more than four pictures if desired, the description will be somewhat specific to the illustrated embodiment solely because it is easier to understand the invention if a concrete example is kept in mind. The invention allows the taking of not only a plurality of pictures on a single film, but also allows the centering of each image or frame on the allotted part of the film. In addition it both guides the operator in choosing the maximum number of separate pictures that may be placed on a single film and assists him in evenly spacing these separate pictures on the film. In addition to providing these functions, the invention has the advantage of allowing any part of the original image to be photographed on an appropriate sized part of the film, and utilization of the remaining parts of the film to photograph a different image (or part of a different image) or a different part of the same image (including partial overlap). Thus the invention allows the maximum utilization of film, without restricting the operator in any manner as to what will be photographed on the various parts of the film.

An object of the invention is therefore the provision of a device which allows the choice of any part of the image field to be photographed on an appropriate sized part of a photographic film, in such manner that the unexposed parts of the photographic film may be efficiently utilized to photograph additional, similar-sized images including images at different locations.

Another object of the invention is the provision of a device which allows the operator to take as many separate pictures on a single film as may be efficiently placed thereon, without restricting the operator as to his preferable framing or centering of each of the images on their allotted part of the film.

A further object of the invention is the provision of a device which allows the taking of a variable number of separate pictures (of various sizes) on a single film without requiring the utilization of different masks for the various sizes of pictures, thereby simplifying both the apparatus and the operation thereof since no interchange of masks is required in operation.

Another object of the invention is the provision of a device of the type described above which assists the operator in determining the maximum number of pictures of the size intended to be taken which may be placed on a film and which further assists the operator in centering each of the separate pictures in that part of the film allotted thereto, without requiring mental computations or difficult operations by the user and also without restricting the user as to how he wishes to frame each of the individual pictures.

Further objects and advantages of the invention will become obvious to one skilled in the art upon reading the following specification in conjunction with the accompanying drawings, in which:

FIGURE 1 is a view of the front of the apparatus, as normally seen by the operator, but with the camera back or plate holder in inoperative position (to the left) so as to reveal the underlying parts;

FIGURE 2 is a side sectional view, taken on the lines 2—2 in FIGURE 1, of the entire apparatus, with the camera back or plate holder in its inoperative position;

FIGURE 3 is an enlarged detail or sectional view taken on lines 3—3 in FIGURE 1;

FIGURE 4 is a part sectional, part side elevational enlarged view taken on the line 4—4 in FIGURE 1;

FIGURE 5 is an enlarged detail view taken on the line 5—5 in FIGURE 4, and

FIGURE 6 is an enlarged detail plan view of the camera scale, shown at the top of FIGURE 1, with the camera back positioned in operative position so as to show the cooperation with the scale of the camera index pointer.

In FIGURES 1 and 2 the main mounting plate 10 is utilized to attach the entire device to an instrument or other stationary apparatus 11, which provides images to be photographed. This mounting plate 10 is therefore stationary at all times relative to the images to be photographed, and carries a pair of upper and lower stationary guides or tracks, 12 and 14, respectively, for supporting in a slideable manner a slide assembly, designated generally 20. The stationary mounting plate 10 may be rigidly attached to the apparatus or other stationary support 11 by conventional means such as screws 16; and the stationary guides 12 and 14 may be similarly attached to this plate 10 by screws 18. Mounting plate 10 has a large, preferably rectangular opening 19, which is coextensive with the entire image field in which apparatus 11 might supply an image.

The slide assembly comprises a main backing or support plate 22, which is mounted in the grooves or tracks of upper and lower stationary guides 12 and 14 (see FIGURE 2). As best seen in FIGURE 1, this slide support plate 22 is apertured so as to leave a rectangular opening (at 24), which is at least as large (in both dimensions) as the entire area of the film to be used with the device, but which is no larger than, and in general is smaller (particularly in the horizontal dimension) than opening 19 in mounting plate 10. It should be noted that the edges of the support plate 22 which define the left-hand edge 26 and the right-hand edge 28 (see FIGURE 1) of aperture 24 do not, in general, define the limit of the area photographed, as will appear hereinafter. On the other hand, the upper and lower edges 30 and 32, respectively, defining aperture 24 in main supporting plate 22 do form the upper and lower masking means for exposure of the film. Because main support plate of the slide assembly is mounted in the tracks formed by upper and lower stationary guides 12 and 14, this plate 22 may be positioned in an adjustable manner horizontally so as to allow both the aperture 24 and the entire slide assembly to be aligned in a desired manner with an image in stationary opening 19 from the device to which the stationary mounting plate 10 is affixed.

As may best be seen in FIGURE 2, a pair of upper and lower double-tracked guides 34 and 36, respectively, are attached near the upper and lower edges of the support plate 22 by means, for example, of screws 38. In the left-hand part (as viewed in FIGURE 1) of the track 40 nearer to support plate 22, a relatively stationary masking plate 42 is rigidly supported. This plate 42 is stationary only in the sense that it moves rigidly with the entire slide assembly 20 (i.e., support plate 22), and in order to insure this rigidity may be attached to the support plate 22, for example, by means of screw 44. As may be seen in FIGURE 1, this stationary masking plate extends from the left side of the slide assembly at 21 to provide convenient manual means for moving the entire slide assembly. The other or right-hand edge 46 extends slightly beyond (i.e., to the right of) the edge 26 defining the left end of opening 24 in the support plate 22. In the right-hand side (as viewed in FIGURE 1) of the same inner track 40 in guides 34 and 36, a movable right-hand masking plate 48 is positioned, as best seen in FIGURE 1 and in the detail view of FIGURE 3, soon to be described. The right-hand end of the movable mask 48 has a curved, outwardly extending flange 50 so as to facilitate manual movement of this plate in the track 40, as may be seen in both FIGURES 1 and 2. A small depression 49 in movable mask 48 acts as a stop against stop 23 on underlying support plate 22 to limit the movement of the mask 48 to the right.

Along the upper edge of movable masking plate 48 are a series of spaced numerals and index lines at 51, 52, 53 and 54. An index arrow 56, positioned on the upper double-tracked guide 34, cooperates with the numerals 51–54 so as to indicate the position of the movable masking plate 48. Specifically, when the numeral 1 (referenced 51) is under index 56, the right-hand movable masking plate 48 will be in its extreme right-hand position so that the opening between the right-hand edge 46 of stationary masking plate 42 and the left-hand edge 58 of movable mask 48 will be at a maximum (equal to the full horizontal width of the film used with the device, so as to allow the taking of a single picture, completely filling the film). When the movable masking plate 48 is moved to the left from this position such that the numeral 2 (referenced 52) is directly under the mask index 56, the left-hand edge 58 of the masking plate will be so positioned as to frame an opening between it and the right-hand edge 46 of stationary masking plate 42 of only one-half of the previous full opening, thereby allowing (and indicating) two pictures to be taken on the single film. Similarly the numerals 3 (at 53) and 4 (at 54) will be under the index (56) when the opening between the stationary and movable masking plates is one third and one quarter, respectively, of the maximum opening, indicating that three and four pictures of this horizontal width may be taken on a single film.

The detail view of FIGURE 3 illustrates the mechanism, including locking knob 60 (which is shown in each of FIGURES 1–3), for releasably immobilizing both the slide assembly (relative to the stationary mounting plate 10) and the movable masking plate 48 (relative to the slide assembly). Knob 60 is integral with a screw threaded shaft 62 which is received in a horizontal threaded bore 64 in upper double-tracked guide 34. Contained in a vertical recess in this upper guide are upper and lower locking pieces or friction latches 66 and 68, respectively. The lower part of upper latching piece 66 and the upper part of the lower latching piece 68 each have canted or wedge-shaped surfaces facing the end of the locking knob 60. A small ball 70 is positioned between the end of the shaft of knob 60 and the two wedge surfaces on latching pieces 66 and 68. It will therefore be seen that as locking knob 60 is turned so as to be screwed into the upper guide 34 (i.e., moved to the left in FIGURE 3), ball 70 will be wedged against the canted surfaces of the latches. This will wedge upper latch 66 in an upward direction and lower latch 68 in a lower direction. Because ball 70 is free to move up or down, this mechanism is self-adjusting or self-centering. Upper latch 66 will therefore bind the upper guide 34 to the stationary mounting plate guide 12, as may be seen from FIGURES 1 and 3. At the same time lower latch 68 will be pressed downwardly onto the upper surface of the movable masking plate 48 so as to bind the movable masking plate to the upper double-tracked guide 34. In this manner tightening of locking knob 60 and its integral screw 62 will bind the double-tracked upper guide 34 (which is rigidly attached to the main support plate 22 of the slide assembly) to both the stationary guide 12 and the movable masking plate 48. Therefore in such tightened condition movable masking plate 48 will be held in a stationary position relative to the slide assembly, and simultaneously the slide assembly will be rigidly held relative to the stationary upper guide 12 and therefore the main support plate 10 (and the instrument 11 to which this main stationary mounting plate is attached). When locking knob 60 is loosened, movable masking plate 48 may be freely moved relative to the rest of the slide assembly, and simultaneously the entire slide assembly may be moved relative to the stationary slides and the main mounting plate 10 (and therefore the instrument and the image provided thereby).

The apparatus so far described is capable of setting an opening of any desired horizontal width up to a maximum comprising the horizontal dimension of the film to be used therewith. In addition, because of the ability to move the entire slide assembly, an image of any horizontal dimension (or any horizontal part of an image) up to the horizontal film width may be centered in the opening formed between the stationary masking plate 42 and movable masking plate 48. In other words movement of the adjustable masking plate 48 allows the size of the opening to be varied at will, while movement of the entire slide assembly allows the opening thus formed to be positioned in any maner relative to the stationary image. In normal operation the entire slide assembly would be moved by means of extension 21 so that the left-hand edge of the opening (defined by the right-hand edge 46 of the stationary mask 42) frames the left-hand edge (as viewed through a ground glass screen or the like) of the part of the image desired to be photographed. The slide assembly is then left in this position while the movable masking plate 48 is positioned (by means of graspable flange 50) so that its left-hand edge 58 frames the right-hand border of the image desired to be photographed. Since the operator would use his left hand for moving the slide (by means of extension 21) and his right hand to move the mask 48 (by means of flange 50) both of these movements may be easily sychronized. In this manner the part of the image desired to be "taken" may be exactly matched to the opening formed between the relatively stationary and movable masking plates 42 and 48, respectively. The camera mask scale, comprised of numerals (referenced 51–54) and the mask index arrow 56 may then be read so as to determine what part of the film would be used by a picture of this lateral extent.

In the position of the movable masking plate 48 shown in FIGURE 1, for example, the mask index 56 falls between the numbers 3 and 4 (referenced 53 and 54), indicating that the opening between the movable and stationary masking plates is between one third and one quarter of the maximum opening, or stated another way, that somewhat more than three (but less than four) pictures of this size can be placed on the film. The locking knob 60 could then be tightened and pictures of this exact size taken. However, since the film is not wide enough (in the horizontal direction) to take four such pictures but is wide enough to take three somewhat wider pictures, there is no advantage in utilizing this particular size aperture. Therefore, the normal procedure would be to move the adjustable masking slide 48 somewhat more to the right until the numeral 3 (referenced 53) is under the mask index 56 to widen the aperture to (in this case) one third of the maximum film width. By moving the entire slide assembly the image desired to be taken may then be centered again within this somewhat wider aperture so as to obtain a little additional image on both sides of the original setting. Thus, the ability of the slide assembly to move independently of both the stationary instrument and the adjustable masking plate 48, and the provision of the mask scale (composed of elements 51–56) allow the operator to ascertain beforehand the most efficient manner of utilizing the film and to center each image on that section of the film utilized therefor. Since adjustment of the movable masking plate 48 and the entire slide assembly 20 are usually accomplished at more or less the same time, the provision of a single locking means (elements 60–70) for both of these simplifies the manipulative procedure for the user.

The remaining parts of the apparatus (shown in FIGURES 1, 2 and 4–6) allow the film to be placed in known controlled positions relative to the opening between the relatively stationary mask 42 and the movable masking plate 48. These parts comprise a camera back assembly, shown generally at 72 in FIGURES 1 and 4, which may include a camera back 73 having both a ground glass viewing screen and means for removably retaining either a film pack or sheet film holders. Since camera backs of this type are well known for use with press cameras and other photographic instruments, the details of how the film is retained in the back 73 (in a removable manner) forms no part of the present invention and is therefore not described in detail. It is deemed sufficient for present purposes to point out that when the camera back assembly 72 is slid to the right in FIGURE 1 so as to be in its operative position, any image present in the openings between the relatively stationary and movable masking plates 42 and 48 will be visible on the ground glass screen provided as part of the camera back 73. After it has been determined in what manner the desired image should be masked by movement of the entire slide (including the camera back and the ground glass therein) and the movable masking plate 48 in a manner just previously described, the film-pack adapter or the sheet film holder may be placed in the camera back in a conventional manner.

Alternatively the camera back may comprise any device which allows viewing of the image and subsequent (or simultaneous) positioning of the film so as to be at the image plane (such as, for example, reflex housings). It is also perfectly practical to utilize a separate viewing device (which itself may comprise a camera back including, say, a ground glass screen with or without provisions for optionally carrying a film pack adapter and/or sheet film holders) and a separate film carrying device, each of which are provided with mounting adapters and indexing (pointer) means about to be described. For purposes of clarity it will be assumed in the following description of the structure and operation of the camera back 73 that it is of a type which contains both a ground glass screen and means for optionally holding a film or film pack; but as just pointed out, this need not be true, the structure and use of a separate ground glass screen holder and film holder being deemed obvious from the following description.

The part of the camera back assembly 72 which is nearest to the slide assembly (and therefore the source of the image to be photographed) is modified so as to carry rigidly thereon a peripheral flange 74, of such thickness as to be adapted to be slideably engaged in the second track 76 (see FIGURES 2 and 4) of the double-tracked upper and lower guides 34 and 36 on the slide assembly. Because of this slideable mounting of the camera back assembly 72, it may be moved relative to slide assembly 20 (and therefore both relatively stationary mask 42 and movable mask 48) so as to position the film carried in the camera back 73 in any desired manner relative to the opening in the masks. As best seen in FIGURES 1, 2 and 4, the upper double-tracked guide 34 has rigidly connected thereto (as by screws 78) a camera scale plate 80. The upper surface of camera scale plate 80 (as viewed in FIGURE 1) carries a series of numbers as will be hereinafter described, which incidentally cooperate with a slide index 82 positioned on the upper stationary guide 12. Since the slide index 82 is on the stationary slide, which in turn is rigidly attached to the completely stationary main mounting plate 10, the camera scale 80 will move relative to index 82 whenever the slide assembly 20 is moved in tracks 40 in upper and lower double-tracked guides 34 and 36. Although camera scale 80 thereby indicates the position (especially one standard one) of the entire slide assembly relative to the completely stationary mounting plate 10 (and instrument 11 to which the mounting plate 10 is rigidly connected), the primary purpose of the camera scale is to assist in positioning the camera back assembly and therefore the film in desired positions relative to the aperture between the two masking plates (42 and 48), as will be described hereinafter.

As best seen in FIGURE 4, the flange 74 is rigidly connected to an annular adapter 84 as by screws 85. This adapter 84 is attached by any convenient means, such as screws 86, to a conventional camera back 73, either directly or by means of a light sealing and spacing annular gasket 88. A pair of vertical velvet strips 90 are provided near the two horizontal ends (as viewed in FIGURE 1) of the annular flange 74, so as to cause light sealing of the camera back to the slide assembly. Similar vertical velvet strips (not referenced) are preferably provided between the other moving surfaces (for example, between the back of support plate 22 of the slide assembly and the facing (front) surface of mounting plate 10, and between the back of the adjustable mask plate 48 and the facing surface of the slide support plate 22).

The upper part of annular adapter 84 has positioned at the center thereof (see FIGURE 1) a camera locking knob and pointer assembly designated generally 92. This assembly comprises a knurled knob 94 for locking the camera back into a stationary position when it is positioned generally behind the exposure aperture in the masking plates, by means of a clamping action on the upper and lower surfaces of the camera scale plate 80. In addition, assembly 92 includes a pointer, which cooperates with the numerals on the upper surface of the camera scale 80. The details of the construction of this assembly 92 are best seen in FIGURES 4 and 5. This camera locking and pointer assembly includes a vertical shaft-like tubular member 96 positioned in an aperture in the upper part of annular adapter 84, which tubular member is locked against rotation by means of a set screw 98. The upper part of tubular member 96 has a central slot cut along that diameter which is in the plane of the paper in FIGURE 4. This slot continues from the very top of member 96 about two thirds of the way toward the bottom, so that the upper part of tubular member 96 comprises two spaced, facing sections 96a and 96b as best seen in FIGURE 5. At the bottom of this slot is positioned a small spring element 100 (see FIGURES 4 and 5), above which are positioned pointer 102 and then clamping element 104. As may be best understood from FIGURE 4, the natural curvature of spring 100 will tend to maintain pointer 102 and clamping element 104 somewhat above the level of upper surface 106 of camera scale plate 80. An elongated, small rod 108, which may be integral or attached to either clamping element 104 or knob 94 (as shown) or alternatively may be entirely a separate element, is positioned above clamping element 104, so as to be pressed thereagainst (directly when integral as shown, or by the inner surface 110 of the knob if rod 108 is a separate element) when knob 94 is screwed down on tubular element 96. To cause this controlled movement of rod 108, at least part of the upper outside surface of tubular member 96 and of the inner surface of knob 94 is provided with cooperating, relatively fine threads 112.

Because of the construction just described, tightening of the knob 94 will cause rod 108 to press against the upper surface of clamping element 104 so as to move this clamp and the pointer 102 downwardly against the spring tension of element 100, thereby lowering all of these elements. When the camera back assembly is in picture-taking position, the camera scale plate 80 will be directly below pointer 102 and clamping element 104 (compare FIGURES 4 and 1). For this reason the upper surface 106 of plate 80 will be contacted by thin, relatively flexible pointer 102 backed by the rigid clamping element 104. A bushing 114 (see FIGURE 4) is provided at the top surface of annular adapter 84, in such a position that its machined upper surface is just below the lower surface 116 of camera scale plate 80. The upper surface of bushing 114 therefore provides the anvil or the other half of the clamp for immobilizing the camera back assembly relative to the slide assembly 20. By loosening the knurled knob 94 and moving the camera back assembly and then retightening this knob, the operator may reposition and lock the camera back in any desired position relative to the opening in the masks 42 and 48 within the range allowed by the length of the camera scale plate 80.

To assist the operator in choosing the most advantageous position for the camera back relative to the mask opening, the camera scale plate bears on its upper surface (106) a series of index lines and numerals. As may best be seen in FIGURE 6, the upper surface 106 of plate 80 has a reference numeral 1 (indicated at 120) near its right-hand end. A certain distance to the left of this numeral 1 (somewhat greater than one half of the distance to the other end of the scale) is a set of hyphenated numerals 2–4 (referenced 122) and an associated index line (132). Halfway between these last two mentioned numerals (120 and 122) is a first numeral 4 (referenced 124). At the same distance to the left of the numeral set 122 as the first numeral 4 (124) is to the number 1 (120), is another numeral 4, labelled 124'. Spaced by equal amounts (but different from the spacing of the other numerals) is a first or right-hand numeral 3 (123) and a second numeral 3 (123'). As may be seen in FIGURE 6 the pointer 102 on the locking and pointer assembly on the upper surface of annular adapter 84 of the camera back assembly 72 cooperates with the index lines (130–134, 133', and 134') associated with the various numerals (120–124, 123' and 124'). In FIGURE 6 the pointer is shown as being aligned with the index line 133 associated with the first or right-hand numeral 3 (123). For the position shown in FIGURE 6 the camera back assembly 72 would be shifted one third of the horizontal width of the film to the left relative to the position where the left-hand edge of the film is aligned with the edge 46 of the relatively stationary mask 42 of the slide assembly. Stated in other words, the left-hand edge of the film will be shifted a distance equal to one third of the width of the film relative to the stationary edge 46 of the stationary masking plate. In order to more fully understand the significance of the various numerals on the camera scale plate and their position relative to each other, an example of operation will now be described.

The operator would first center the ground glass screen, whether it is carried by the camera back 72 or by a separate assembly having a pointer (and preferably a clamp) corresponding to that shown and previously described on the camera back 72 and annular adapter 84, relative to the slide assembly by setting the pointer 102 on the index 130 directly under the numeral 1 (120) on the camera scale (which numeral and index are at the horizontal center of the slide assembly). The operator would then loosen the slide locking knob 60 so as to allow adjustment of both the entire slide assembly (now carrying together the relatively stationary mask 42 and the adjustable ground glass assembly) as well as the adjustable masking plate 48. In the manner previously described, the operator would then move the entire slide assembly until the relatively stationary mask 42 was positioned at the left-hand edge of the image desired to be photographed. The operator would then move the adjustable mask 48 until its edge 58 defined the right-hand edge of the image desired to be photographed (as previously described above). Assuming that this operation results in the particular position of the slide assembly and adjustable masking plate shown in FIGURE 1, the slide assembly would be at its left-hand position (i.e., edge 46 of mask 42 would just overlie the left-hand edge of opening 19 in mounting plate 10), and the adjustable masking plate 48 would be positioned so that mask index 56 was between the numerals 3 and 4 (referenced 53 and 54) indicating that the picture desired was between one quarter and one third of the horizontal width of the film. As previously stated, the operator would then move the masking plate 48 until the numeral 3 (53) was under the index 56, thereby making the opening between the two masking plates equal to one third of the width of the film. After recentering the image in the now somewhat larger opening, the operator would lock the slide-locking knob 60, thereby immobilizing both the slide assembly and the adjustable masking plate 48.

If the operator were now to photograph this image on a piece of film which has not been utilized at all (i.e., no part had been previously exposed), the operator would leave the camera back in its initial position and take a first exposure, by operating a shutter either in the instrument 11 in the camera back 73 or anywhere therebetween. It should be noted that in all normal operations the first picture is taken with the pointer 102 on the index line 130 associated with the number 1, regardless of how many (i.e., from one to four) pictures are to be taken on the film. This photographing would of course be accomplished by utilizing the conventional means for introducing a film into the camera back, such as by means of a film holder or film pack or the like, or alternatively it could be accomplished by replacing the ground glass screen holder with the camera back (if two separate assemblies are utilized as previously mentioned) with the pointer thereon also on the central index 130.

Let us assume, however, that this first picture has already been taken, and another image in the exact same position is desired to be photographed. This may occur quite often in normal usage where the same area of whatever image is being photographed is to be photographed again at a different time (for example, the image may be of the pictorial output of an instrument, such as a meter or oscilloscope, or the image of a microscope, optical interferometer or the like). In order to take a picture on the next third of the film (which would be the middle third of the film) the operator need only loosen knob 94 and move the camera back assembly to the position indicated in FIGURE 6 with the pointer over the index 133 of the first numeral 3 (at 123). More explicity, moving the camera back to the position indicated in FIGURE 6 causes the entire camera back assembly (and therefore of course the film) to be shifted a distance equal to one third of the width of the film to the left. This therefore positions the center third of the film over the image (which was aligned with the left-hand third of the film before the camera back assembly was shifted), so that a second exposure may be taken on the central third of the film (after knob 94 has been retightened). When it is desired to take a third picture on the same film (which third picture must, of course, also be no larger than one third the width of the film, but may be smaller), the operator may simply move the entire camera back assembly to the left (a distance equal to the previous movement) so that the pointer 102 is aligned with the index 133' of the left-hand numeral 3 (123'). This will position the right-hand third of the film in alignment with the image in the opening in the mask, thereby allowing this last third of the film to be utilized efficiently.

From the above description it should be obvious that the technique for taking two or four pictures (of one half or one fourth, respectively, of the width of the film) is very similar. If in originally setting up the image in the mask by moving the slide assembly and movable masking plate 48 as previously described, the masking plate 48 is closer to the stationary masking plate 42 (i.e., a narrower opening is sufficient to contain the image), the numeral 4 (54) of the camera mask scale on the movable plate 48 may be under the mask index 56 (or possibly even to the left of that index). Under such circumstances the operator is apprised of the fact that four pictures of that narrow a width may be taken on a single film, and he therefore would utilize the numerals 4 on the camera scale 80 (see FIGURE 6) for taking three pictures after the first one. Specifically, he would take the first picture with the pointer 102 on the reference numeral 1 (120) as before, but would take the second picture with the pointer 102 on the index line 134, associated with the first or right-hand numeral 4 (124). A third picture would then be taken with the pointer 102 on index line 132 associated with the hyphenated numerals 2–4 (at 122). These hyphenated numerals indicate that this is the position corresponding to one half (and therefore two fourths) of the film width. Therefore the pointer would be positioned to the index line 132 for taking the third picture of four, as well as taking the second picture of two. After taking the third picture, the operator would then move the camera back assembly so that pointer 102 overlies index line 134' of the left-hand numeral 4 (124') and take the fourth and last picture.

It will now be obvious that the distance between the reference numeral 1 and the first numeral 4 (124) is equal to one fourth the width of the film, and numerals 122 and 124' are each in turn this same distance to the left of each other. Similarly it should be obvious that the first or right-hand numeral 3 (at 123) is a distance to the left of numeral 1 (at 120) a distance equal to one third the width of the film, and the left-hand numeral 3 (at 123') is at the same distance to the left of the first numeral 3 (123). The camera scale therefore allows the operator to move the camera back relative to the aperture in the mask by even increments equal to one half, one third, or one quarter of the film width. It is deemed obvious that additional numerals spaced at other equal intervals may be added to the camera scale (and preferably a single corresponding numeral added also to the mask scale) if adaptation to taking more than four pictures is desired.

As previously pointed out, the camera back itself (as distinguished from the adapter and the locking and pointer assembly parts) may be conventional and forms no part of the invention. In particular, either a combination ground glass and film holder type of back may be utilized, or alternatively, a ground glass carrier (preferably including a pointer and optionally a locking assembly) and a separate camera back (with the pointer and locking assembly) having provisions solely for carrying film (sheet film holders, film packs, or roll film) may be used instead.

It should be noted that the operator is free to change what is framed within the opening 24 formed by the relatively stationary mask 42 and the movable one 48 any time he chooses (including between pictures taken on the same film) without causing any misregistration, uneven spacing, overlapping or other undesirable relationships of the pictures on the film. This versatility is possible because movement of the entire slide assembly 20 (along with the camera back assembly 72) does not change what part of the film will be exposed. Thus the operator may take the first picture so that one part of a large image is in the mask opening 24. He then may move the entire slide assembly to position a different part of the image (available in the stationary opening 19) in the mask opening 24 (utilizing the viewer, such as the ground glass screen in the camera back or a separate viewer, preferably having a central pointer similar to that at 102). The picture is still taken in the same manner as before, since only the relative position of the slide assembly and the film carrier (such as film back assembly 72) determines what part of the film will be exposed; and the position of the pointer 102 on the film carrier relative to the scale on the upper surface 106 of the camera scale plate 80 indicates this relative position independent of the position of the slide assembly relative to the completely stationary parts (exemplified by mounting plate 10, stationary aperture 19 and the image therein). Thus, the operator is free to choose different parts of the full image within the mask opening 24 between exposures, or else recenter the same part of the image if the latter is moving at a moderate rate (as may occur for example in the microscope image of an organic specimen or in an oscilloscope or other instrument output because of drift, for example).

The major advantage of the invention is the ability of the apparatus not only to take different size pictures and utilize the film efficiently, but also the inclusion of relative freedom to position the image to be taken within the mask opening (and therefore on that part of the film on which it will ultimately appear) in any desired manner. This versatility is accomplished by the provision of: a slide assembly which may be adjusted so as to position the left-hand edge of the mask in any desired position; a separately adjustable masking plate 48 to define the right-hand edge (and the size of the picture); a mask scale means for assisting the operator in determining how many pictures of the desired size can be taken on one film; and a camera scale for correct positioning of the camera back (and therefore of the film) relative to the slide assembly (and therefore the masks) for the particular size pictures desired. An additional convenience is provided by the simple locking means for both the slide assembly and the adjustable masking plate. These constructional features all contribute to the utmost versatility, coupled with relative ease of use, in a single apparatus.

However, since the advantages mentioned just above and elsewhere in the foregoing description may be obtained by utilizing constructional details somewhat different from the illustrated preferred embodiment, the invention is not limited to any such details; on the contrary, the invention is defined solely by the scope of the appended claims.

What is claimed is:

1. A device for photographing a desired area, containing at a certain time the particular desired image produced by a stationary instrument within a larger stationary image field, on an appropriately sized section of a film, comprising:

stationary support means, rigidly attached to said stationary instrument, for movably mounting a slide assembly;

a slide assembly movably mounted by said support means in a linearly movable manner relative to said stationary image field;

a first relatively stationary masking means rigidly attached to said slide assembly for framing one edge of that area of said image field desired to be photographed;

a second movable masking means movably mounted on said slide assembly for framing the edge of said desired image area opposite and substantially parallel to said one edge;

whereby the position of said slide assembly determines the framing of said one edge, and the position of said movable masking means determines the framing of said opposite edge, and therefore also the size, of said desired image area;

and means for adjustably positioning a film holder behind said two masking means, said film holder therefore being adjustable relative to said stationary image field, so as to allow photographing of said framed desired image area on an appropriate unexposed section of the film carried thereby.

2. The device of claim 1, in which:

locking means are provided both for immobilizing said second movable masking means relative to said slide assembly and for immobilizing said slide assembly relative to said stationary image field.

3. The device of claim 2, in which:
said locking means comprises a single operating means, movement of which causes said immobilization of both said second movable masking means and said slide assembly simultaneously.

4. The device of claim 1, in which:
said means for adjustably positioning said film holder comprises means for movably mounting and optionally locking said film holder on said slide assembly;
whereby movement of said slide assembly and therefore said first relatively stationary masking means for framing said desired image area also moves said film holder in the same manner;
so that the same section of the film remains framed by said first relatively stationary masking means regardless of any framing movement of said slide assembly with said first masking means.

5. The device of claim 1, in which:
a mask scale and cooperating index means are provided, one being fixed relative to said slide assembly and the other being fixed relative to said second movable masking means;
said mask scale having calibrations indicating the size of the opening framed by said two masking means in terms of the corresponding linear dimension of the film carried by said film holder.

6. The device of claim 5, in which:
in addition to said mask scale and index means, a camera scale and cooperating index means are provided, one of said last mentioned means being fixed relative to said slide assembly and therefore said first relatively stationary masking means and the other being fixed relative to said film holder;
said camera scale including indicia yielding information as to where the film holder should be positioned to take, on a single film, a plurality of pictures of the size indicated by said mask scale.

7. The device of claim 6, in which:
the calibrations on said mask scale and said indicia on said camera scale comprise identical characters for corresponding mask opening sizes and film holder positions, respectively.

8. A device for photographing a desired area of a relatively stationary image field on an appropriate section of a film comprising:
a first and a second masking means for framing substantially parallel edges of that area of the image field desired to be photographed;
both said masking means being mounted for such independent movement relative to each other and said image field that both a linear dimension of said framed, desired area and its location in the direction along said linear dimension may be completely independently varied;
locking means for immobilizing each of said masking means relative to said stationary image field;
said locking means comprising a single operating means, movement of which causes simultaneous locking of both said masking means;
and means for adjustably positioning a film holder behind said masking means, so as to allow photographing of said framed, desired image area on an appropriate unexposed section of the film carried thereby.

References Cited by the Examiner
UNITED STATES PATENTS

| | | | |
|---|---|---|---|
| 406,934 | 7/1889 | Munger | 95—36 |
| 773,627 | 11/1904 | Boston | 95—37 |
| 969,360 | 9/1910 | Grandperrin | 95—37 |
| 1,056,588 | 3/1913 | Rusk | 95—36 |
| 1,263,619 | 4/1918 | Stanley | 95—36 |
| 1,782,860 | 11/1930 | Reipert | 95—36 X |

JOHN M. HORAN, *Primary Examiner.*